United States Patent
Savarkar et al.

(10) Patent No.: US 10,412,450 B1
(45) Date of Patent: Sep. 10, 2019

(54) SYSTEMS AND METHODS FOR MANAGING LOCAL AND CLOUD STORAGE FOR MEDIA ASSETS

(71) Applicant: Rovi Guides, Inc., San Jose, CA (US)

(72) Inventors: Abhijit Satchidanand Savarkar, Andover, MA (US); Vineet Agarwal, Andover, MA (US); Abubakkar Siddiq, Methuen, MA (US); Ganesh Ramamoorthy, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/937,827

(22) Filed: Mar. 27, 2018

(51) Int. Cl.
*H04N 21/45* (2011.01)
*H04L 29/08* (2006.01)

(52) U.S. Cl.
CPC ..... *H04N 21/4532* (2013.01); *H04L 67/1097* (2013.01); *H04N 21/4516* (2013.01)

(58) Field of Classification Search
CPC ............ H04N 21/4532; H04N 21/4516; H04L 67/1097
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 2002/0174430 A1 | 11/2002 | Ellis | |
| 2004/0103437 A1* | 5/2004 | Allegrezza | H04N 7/17336 725/95 |
| 2005/0251827 A1 | 11/2005 | Ellis | |
| 2009/0100478 A1* | 4/2009 | Craner | G11B 19/00 725/87 |
| 2010/0153885 A1 | 6/2010 | Yates | |
| 2014/0233923 A1* | 8/2014 | Bradley | H04N 21/25891 386/298 |
| 2015/0237384 A1* | 8/2015 | Ruffini | H04N 21/23106 725/92 |
| 2017/0006314 A1* | 1/2017 | Danovitz | H04L 67/1097 |
| 2017/0034571 A1* | 2/2017 | Natarajan | H04N 21/4335 |
| 2017/0230706 A1* | 8/2017 | Rogers | H04N 21/4147 |
| 2017/0332036 A1 | 11/2017 | Panchaksharaiah | |

(Continued)

*Primary Examiner* — Benjamin R Bruckart
*Assistant Examiner* — Aklil M Tesfaye
(74) *Attorney, Agent, or Firm* — Haley Guiliano LLP

(57) ABSTRACT

Systems and methods are described for managing local and cloud storage space for a plurality of media assets. The media guidance application may detect that a command was received to delete a first media asset from storage. In response to detecting the command, the media guidance application may determine a viewing pattern for the first media asset associated with a subset of users in a plurality of users, where the subset of users consumed the first media asset. The media guidance application may retrieve viewing commands associated with a second media asset performed by the subset of users, where the second media asset is related to the first media asset. The media guidance application may determine whether the viewing commands satisfy the viewing pattern. And in response to determining that the commands satisfy the viewing pattern, the media guidance application may delete the second media asset from storage.

20 Claims, 8 Drawing Sheets

(56) References Cited

U.S. PATENT DOCUMENTS

| | | |
|---|---|---|
| 2017/0332125 A1 | 11/2017 | Panchaksharaiah |
| 2017/0332139 A1 | 11/2017 | Panchaksharaiah |
| 2018/0007437 A1* | 1/2018 | Jin .................... H04N 21/4583 |
| 2018/0067939 A1* | 3/2018 | St. Thomas ........ G06Q 30/0204 |

* cited by examiner

SYSTEMS AND METHODS FOR MANAGING LOCAL AND CLOUD STORAGE FOR MEDIA ASSETS

BACKGROUND

Recording and storing media assets onto both local and cloud storage devices is a commonly used technique to help preserve media assets for future viewing. The related art describes various ways of deleting media assets from local and cloud storage after the local and cloud storage devices only have a certain amount of storage available remaining on which to store media assets. For example, the related art describes systems where the oldest recorded media asset stored on the local storage device is deleted from the storage device when the local storage device only has a certain amount of storage (e.g., 5% left) or transferring media from the local storage to remote storage when the local storage has less than a threshold amount of storage left. The related art fails to proactively find media assets to delete, which results in situations where users are inconvenienced and forced to manually choose which media assets to delete when local and cloud storage space is not available. Typical media applications fail to consider dynamically managing local and cloud storage based on learned behaviors from one or more users in a household.

SUMMARY

Accordingly, systems and methods are provided herein for managing local and cloud storage space for a plurality of media assets. For example, a media guidance application may determine that a first media asset was deleted from storage. In response to detecting the command, the media guidance application may determine a viewing pattern for the first media asset associated with a subset of users in a plurality of users within a household, where the subset of users consumed the first media asset. The media guidance application may retrieve a plurality of viewing commands associated with a second media asset performed by the subset of users, where the second media asset is related to the first media asset. As referred to herein, viewing commands are defined to be commands for facilitating viewing a media asset, such as trick play bar commands (e.g., play, pause, stop, fast forward, rewind, etc.), remote controller commands, etc. The media guidance application may determine whether the plurality of viewing commands satisfy the viewing pattern. And, in response to determining that the plurality of commands satisfy the viewing pattern, the media guidance application may proactively delete the second media asset from storage automatically.

To this end and others, in some aspects of the disclosure, a media guidance application may determine that a first media asset was deleted from storage. For example, the media guidance application may receive a command from a user via a remote control to delete the first media asset (e.g., the first episode of the HBO show, Westworld) from storage.

In some embodiments, when the media guidance application detects that the command was received to delete the first media asset from storage, the media guidance application may determine that the command was received from a user in the subset of users. The media guidance application may determine that the subset of users is comprised of users that consumed (e.g., watched) the first media asset. For example, the media guidance application may determine that the command was received from a user (e.g., based on the profile for the user) in the subset of users (e.g., a family) to delete the first media asset (e.g., an episode of Westworld).

The media guidance application may in response to detecting the command, determine a viewing pattern for the first media asset associated with a subset of users in a plurality of users within a household, where the subset of users consumed the first media asset. The media guidance application may determine the viewing patterns based on analyzing the viewing commands related to the media asset corresponding to the subset of users. For example, the media guidance application may determine a viewing pattern (e.g., which users watch Westworld, when those users watch the newest episode of Westworld, etc.) using viewing commands (e.g., play, pause, stop, etc.) associated with a subset of users (e.g., the three users in the household that watch Westworld) in a plurality of users (e.g., a total of five users in the household) within a household.

The media guidance application may retrieve, from user profiles corresponding to the subset of users in a plurality of user profiles, viewing commands performed by each user in the subset of users related to the first media asset prior to the first media asset being deleted from storage. For example, the media guidance application may retrieve, from user profiles corresponding to the subset of users (e.g., the three users that watch Westworld), viewing commands (e.g., trick play bar commands, viewing histories, etc.) performed by each user in the subset of users related to the first media asset (e.g., the first episode of Westworld).

The media guidance application may determine, from the viewing commands, an amount of consumption of the first media asset for each user in the subset of users. For example, the media guidance application may determine from the viewing commands (e.g., trick play bar commands), an amount of consumption of the first media asset (e.g., the first episode of Westworld) for each user in the subset of users.

In some embodiments, when the media guidance application is determining, from the viewing commands, an amount of consumption of the first media asset for each user in the subset of users, the media guidance application may calculate, from the viewing commands, an amount of time that each user in the subset of users viewed the first media asset. For example, the media guidance application may calculate, from the viewing commands (e.g., the play and pause commands), an amount of time that each user in the subset of users viewed the first media asset (e.g., the first episode of Westworld). For example, the media guidance application may use the timestamps from the start and stop commands selected by the user to start and stop watching the first episode of Westworld to determine the amount of time that the user watched the first episode of Westworld.

The media guidance application may retrieve the total run time of the first media asset from metadata associated with the first media asset. For example, the media guidance application may retrieve the total run time (e.g., 68 minutes) of the first media asset (e.g., the first episode of Westworld) from the metadata associated with the first media (e.g., retrieved from metadata stored in the profile).

The media guidance application may determine from the amount of time for each user in the subset of users and the total run time of the first media asset the amount of consumption of the first media asset for each user in the subset of users. For example, the media guidance application may determine from the amount of time for each user (e.g., 32 minutes for the first user, 60 minutes for the second user, and 68 minutes for the third user) in the subset of users (e.g., three users out of five total users) and the total run time of the first media asset (e.g., 68 minutes for the first episode of Westworld), the amount of consumption of the first media asset for each user (e.g., 47% for the first user, 88% for the second user, and 100% for the third user) in the subset of users (e.g., three users out of five users).

The media guidance application may retrieve a plurality of viewing commands associated with a second media asset performed by each user in the subset of users. The media guidance application may determine that the second media asset is related to the first media asset (e.g., based on metadata for the first media asset and the second media asset, retrieved from the profile). As referred to herein, related media assets are any media assets that share characteristics, such as the media assets being in the same episodic series (e.g., short form television series, mini series, long form movie series, etc.), sharing the same genre (e.g., reality, comedy, cooking, contest, action, drama, or any such genre that may apply), or any similar characteristic. For example, the media guidance application may retrieve (e.g., from user profiles) a plurality of viewing commands associated with a second media asset (e.g., the second episode of Westworld) performed by each user in the subset of users. The media guidance application may determine that the second media asset (e.g., the second episode of Westworld) is related to the first media asset (e.g., the first episode of Westworld) because both media assets are part of the same episodic series (e.g., Westworld).

The media guidance application may determine whether the plurality of commands satisfy the viewing pattern. For example, the media guidance application may compare the plurality of commands to the viewing pattern, as described in detail below.

The media guidance application may determine an amount of consumption of the second media asset for each user in the subset of users. For example, the media guidance application may determine the amount of consumption using similar methods as described above for determining the amount of consumption for the first media asset.

In some embodiments, when the media guidance application determines the amount of consumption of the second media asset for each user in the subset of users, the media guidance application may periodically retrieve, from the user profiles corresponding to the subset of users in the plurality of user profiles, viewing commands performed by each user in the subset of users related to the second media asset. For example, the media guidance application may periodically retrieve (e.g., once a day), from the user profiles corresponding to the subset of users in the plurality of user profiles, viewing commands performed by each user in the subset of users related to the second media asset (e.g., the second episode of Westworld).

The media guidance application may periodically calculate an updated amount of consumption of the second media asset for each user in the subset of users. For example, the media guidance application may periodically calculate (e.g., once a day) an updated amount of consumption of the second media asset for each user in the subset of users (e.g., 100% for user one, 90% for user two, and 100% for user three).

The media guidance application may update the amount of consumption of the second media asset for each user in the subset of users to be the updated amount of consumption of the second media asset for each user in the subset of users. For example, the media guidance application may update the amount of consumption of the second media asset (e.g., the second episode of Westworld) for each user in the subset of users to be the updated amount of consumption (e.g., 100% for user one, 90% for user two, and 0% for user three).

The media guidance application may compare the amount of consumption of the second media asset for each user in the subset of users to the amounts of consumption of the first media asset from the viewing pattern. For example, the media guidance application may compare the amount of consumption of the second media asset for each user in the subset of users (e.g., 47% for the first user, 88% for the second user, and 100% for the third user) to the amounts of consumption of the first media asset from the viewing pattern (e.g., 100% for user one, 90% for user two, and 100% for user three).

In some embodiments, when the media guidance application compares the amount of consumption of the second media asset for each user in the subset of users to the amounts of consumption of the first media asset from the viewing pattern, the media guidance application may determine whether the amount of consumption of the second media asset for each user in the subset of users exceeds the amount of consumption of the first media asset for each user in the subset of users. For example, the media guidance application may determine whether the amount of consumption of the second media asset (e.g., 100% for user one, 90% for user two, and 100% for user three) exceeds the amount of consumption of the first media asset (e.g., 47% for the first user, 88% for the second user, and 100% for the third user).

In response to determining whether the amount of consumption of the second media asset for each user in the subset of users exceeds the amount of consumption of the first media asset for each user in the subset of users, the media guidance application may determine that plurality of viewing commands satisfy the viewing pattern.

In response to determining that the plurality of viewing commands satisfy the viewing pattern, the media guidance application may delete the second media asset from storage automatically (without user input). For example, in response to determining that the plurality of viewing commands satisfy the viewing pattern, the media guidance application may delete the second media asset (e.g., the second episode of Westworld) from storage.

In some embodiments, when the media guidance application deletes the second media asset from storage, the media guidance application may determine whether the second media asset is stored at one of a cloud storage device or a local storage device or whether the second media asset is stored at both the cloud storage device and the local storage device. For example, the media guidance application may determine that the second media asset is stored on both the cloud storage device (e.g., a remote server) and the local storage device (e.g., a local hard drive).

In response to determining that the second media asset is stored on both the cloud storage device and the local storage device, the media guidance application may determine whether the cloud storage device has more available storage than the local storage device. For example, the media guidance application may send a request to the cloud storage device and the local storage device requesting the amount of available storage. Based on the response to the request (e.g., the cloud storage has 100 GB of available space and the local storage has 1 GB of available space), the media guidance application may determine that the cloud storage device has more available storage than the local storage device.

In response to determining that the cloud storage device has more available storage than the local storage device, the media guidance application may delete the second media asset from the local storage device. For example, the media guidance application may delete the second media asset (e.g., the second episode of Westworld) from the local storage device (e.g., the local hard drive).

In some embodiments, in response to determining that the second media asset is stored on both the cloud storage device and the local storage device, the media guidance application may determine whether the cloud storage device has more available storage than the local storage device. For example, the media guidance application may send a request to the cloud storage device and the local storage device requesting the amount of available storage. Based on the response to the request (e.g., the cloud storage has 10 GB of available space and the local storage has 100 GB of available space), the media guidance application may determine that the local storage device has more available storage than the cloud storage device.

In response to determining that the cloud storage device has less available storage than the local storage device, the media guidance application may delete the second media asset from the cloud storage device. For example, the media guidance application may delete the second media asset (e.g., the second episode of Westworld) from the cloud storage device (e.g., the remote server).

In some embodiments, in response to determining that both the cloud storage device and the local storage device do not have available storage, the media guidance application may delete the second media asset from both the cloud storage device and the local storage device. For example, the media guidance application may delete the second media asset (e.g., the second episode of Westworld) from the local storage device (e.g., the local hard drive) and the cloud storage device (e.g., the remote server).

BRIEF DESCRIPTION OF THE FIGURES

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for managing local and cloud storage space for a plurality of media assets. The media guidance application may determine that a first media asset was deleted from storage. In response to detecting the command, the media guidance application may determine a viewing pattern for the first media asset associated with a subset of users in a plurality of users within a household, where the subset of users consumed the first media asset. The media guidance application may retrieve a plurality of viewing commands associated with a second media asset performed by the subset of users, where the second media asset is related to the first media asset. The media guidance application may determine whether the plurality of viewing commands satisfy the viewing pattern. And in response to determining that the plurality of commands satisfy the viewing pattern, the media guidance application may delete the second media asset from storage.

Figure 1A:
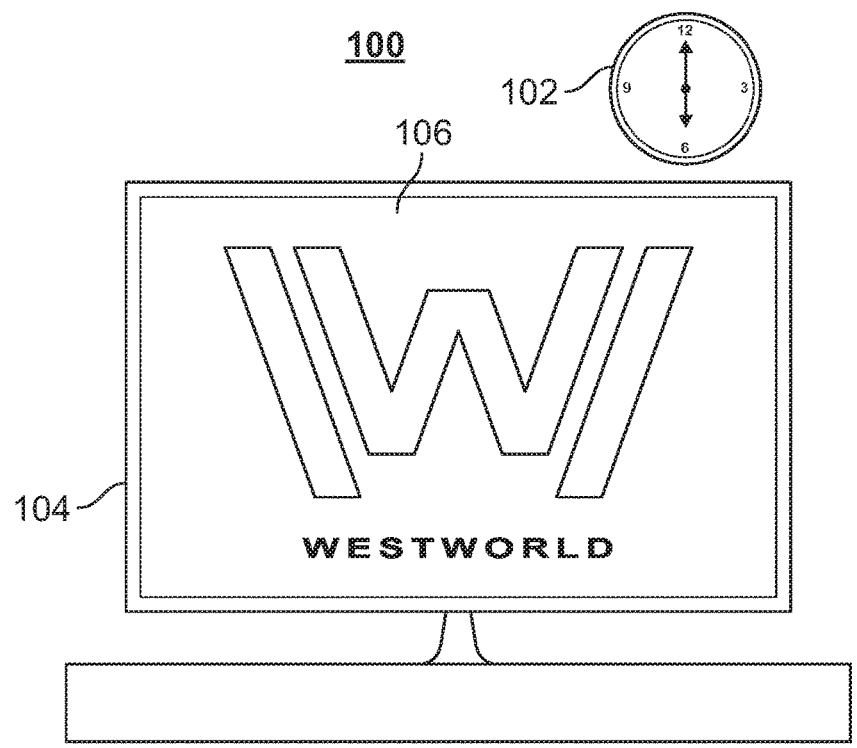
FIG. 1A shows an illustrative embodiment of managing local and cloud storage space for a plurality of media assets, in accordance with some embodiments of the disclosure.

FIG. 1A shows an illustrative embodiment of managing local and cloud storage space for a plurality of media assets, in accordance with some embodiments of the disclosure. FIG. 1A depicts user equipment 104, which may include control circuitry that executes a media guidance application on any user equipment. The functionality of user equipment, control circuitry, and the media guidance application is described in further detail below with respect to FIGS. 2-5.

The media guidance application may be playing back media asset 106 on user equipment 104 at time 102 in environment 100. For example, media guidance application may be playing back media asset 106 (e.g., an episode of the HBO show Westworld) at time 102 (e.g., 6 pm) on user equipment 104. First user 108 and second user 110 may be viewing media asset 106 being played back by the media guidance application at time 102. First user 108 and second user 110 may be a part of a household of users, which may encompass any number or group of users. As referred to herein, a household of users refers to a set of users who are associated with the same cloud and local storage (e.g., the set of users who use/interact with the same DVR/home media system and/or have user profiles associated with the same home media system). For example, a household of users may refer to a set of five users that share the same cloud and local storage space for storing media assets.

Figure 1B:
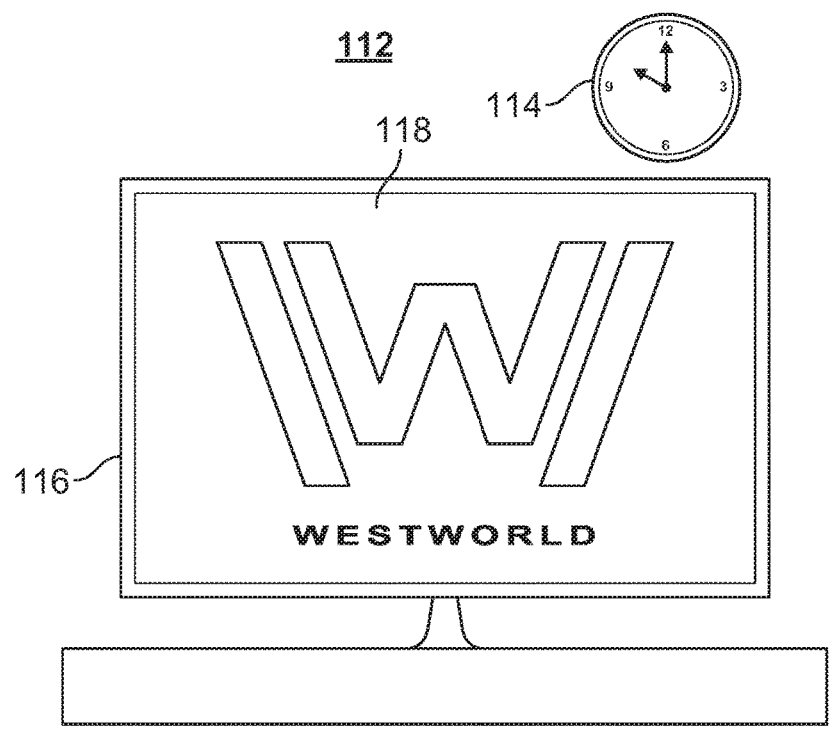
FIG. 1B shows an illustrative embodiment of managing local and cloud storage space for a plurality of media assets, in accordance with some embodiments of the disclosure.

FIG. 1B shows an illustrative embodiment of managing local and cloud storage space for a plurality of media assets, in accordance with some embodiments of the disclosure. FIG. 1B depicts user equipment 104, which may include control circuitry that executes a media guidance application on any user equipment. The functionality of user equipment, control circuitry, and the media guidance application is described in further detail below with respect to FIGS. 2-5.

The media guidance application may be playing back media asset 118 on user equipment 116 at time 114 in environment 112. For example, media guidance application may be playing back media asset 118 (e.g., an episode of Westworld) on user equipment 116 at time 114 (e.g., 10 pm). Third user 120 may be viewing media asset 118 being played back by the media guidance application at time 114. Environment 100 and environment 102 may be the same environments (e.g., the same living room) at two different times (e.g., time 102 and time 114). Media asset 106 and media asset 116 may be the same media asset (e.g., the same episode of Westworld). User 120 may be a part of a household of users, including the household with user 108 and user 110.

In some embodiments, the media guidance application may determine that a first media asset was deleted from storage. For example, the media guidance application may receive a command from a user (e.g., user 108, user 110, or user 120) via a remote control to delete the first media asset (e.g., the first episode of the HBO show, Westworld) from storage.

In some embodiments, the media guidance application may detect a command from a user (e.g., the command may be from user 108, user 110, or user 120) via a remote control, a voice command, or a combination of the both to delete the first media asset from local storage, cloud storage, or both. The media guidance application may determine that the command selects both the media asset to delete as well as which storage platform (e.g., cloud storage, local storage, or both) to delete the media asset from.

In some embodiments, when the media guidance application detects that the command was received to delete the first media asset from storage, the media guidance application may determine that the command was received from a user in the subset of users. For example, the media guidance application may retrieve the profile associated with the user giving the command, and compare the profile with the profiles corresponding to the subset of users. The media guidance application may determine, from the comparison, whether the user's profile is contained within profiles from the subset of users. If the profile is contained within the profiles from the subset of users, the media guidance application may determine that the delete command was received from a user in the subset of users.

The media guidance application may in response to detecting the command, determine a viewing pattern for the first media asset associated with a subset of users in a plurality of users within a household, where the subset of users consumed the first media asset. For example, the media guidance application may determine a viewing pattern (e.g., which users watch Westworld, when those users watch the newest episode of Westworld, etc.) associated with a subset of users (e.g., the three users in the household that watch Westworld, user 108, user 110, and user 120) in a plurality of users (e.g., a total of five users in the household) within a household. The media guidance application may determine the viewing pattern from the viewing commands performed by the subset of users for the first media asset.

The media guidance application may retrieve, from user profiles corresponding to the subset of users in a plurality of user profiles, viewing commands performed by each user in the subset of users related to the first media asset prior to the first media asset being deleted from storage. The media guidance application may retrieve the viewing commands from a database associated with each user profile.

In some embodiments, the media guidance application may associate viewing commands with a user by generating a prompt to be displayed on user equipment 104 (e.g., upon turning on user equipment 104, or upon the first viewing command being detected) to allow the user to select a corresponding user profile. After receiving the user's selected profile, the media guidance application may associate all detecting viewing commands with the corresponding user profile, until a new user is detected.

In some embodiments, the media guidance application may associate viewing commands with a user using a sensor in environment 100. For example, the media guidance application may user a camera and facial recognition to determine which users are watching the media asset. The media guidance application may associate the viewing commands with the determined users and the determined users' corresponding profiles. Determining which users are viewing a media asset in an environment are described in greater detail in Panchaksharaiah et al. U.S. patent application Ser. No. 15/200,194, filed Jul. 1, 2016, Panchaksharaiah et al. U.S. patent application Ser. No. 15/200,216, filed Jul. 1, 2016, and Blake et al. U.S. patent application Ser. No. 15/200,634, filed Jul. 1, 2016, which are hereby incorporated by reference herein in their entireties.

For example, the media guidance application may retrieve, from user profiles corresponding to the subset of users (e.g., the three users that watch Westworld), viewing commands (e.g., trick play bar commands, viewing histories, etc.) performed by each user in the subset of users related to the first media asset (e.g., the first episode of Westworld).

The media guidance application may determine, from the viewing commands, an amount of consumption of the first media asset for each user in the subset of users. For example, the media guidance application may determine from the viewing commands (e.g., trick play bar commands), an amount of consumption of the first media asset (e.g., the first episode of Westworld) for each user in the subset of users. As referred to herein, an amount of consumption refers to the user's relationship with media asset, including which portions of the media asset the user viewed, which portion of the media asset the user fast-forwarded or skipped, the pattern of viewing commands that the user used when viewing the media asset (e.g., 3 fast-forwards, followed by 10 minutes of viewing the media asset, followed by a pause and two rewind operations), and other similar interactions between the user and the media asset.

In some embodiments, when the media guidance application is determining, from the viewing commands, an amount of consumption of the first media asset for each user in the subset of users, the media guidance application may determine, from the viewing commands, the pattern of viewing commands that a user in the subset of users input when viewing the first media asset. For example, the media guidance application may determine, from the viewing commands (e.g., play, 3-fast forwards, view 10 minutes of the media asset, pause, fast-forward, play) performed by the user (e.g., via a remote control or voice commands) when viewing the first media asset, the pattern of viewing commands for the user in the subset of users. The media guidance application may determine that the pattern of viewing commands for each user in the subset of users is the amount of consumption of the first media asset, or is a part of the amount of consumption of the first media asset along with the amount of time the user viewed the media asset, as described below.

In some embodiments, when the media guidance application is determining, from the viewing commands, an amount of consumption of the first media asset for each user in the subset of users, the media guidance application may calculate, from the viewing commands, an amount of time that each user in the subset of users viewed the first media asset. The media guidance application may retrieve start and stop timestamps for the time when each user in the subset of users viewed the media asset (e.g., the first episode of Westworld). The media guidance may calculate (e.g., by subtracting the start time from the stop time), from the viewing commands, the amount of time that each user in the subset of users viewing the first media asset (e.g., the first episode of Westworld).

For example, the media guidance application may calculate, from the viewing commands (e.g., the play and pause commands), an amount of time that each user in the subset of users viewed the first media asset (e.g., the first episode of Westworld). The media guidance application may use the timestamps from the start and stop commands selected by the user (e.g., user 108, user 110, or user 120) to start and stop watching the first episode of Westworld to determine the amount of time that the user (e.g., user 108, user 110, or user 120) watched the first episode of Westworld.

Alongside the amount of time that the user viewed the media asset, the media guidance may also use the run time of the media asset to determine the amount of consumption. The media guidance application may retrieve the total run time of the first media asset from metadata associated with the first media asset. For example, the media guidance application may retrieve the total run time (e.g., 68 minutes) of the first media asset (e.g., the first episode of Westworld) from the metadata associated with the first media (e.g., retrieved from metadata stored in the profile).

The media guidance application may determine from the amount of time for each user in the subset of users and the total run time of the first media asset the amount of consumption of the first media asset for each user in the subset of users. For example, the media guidance application may determine from the amount of time for each user (e.g., 32 minutes for the first user, 60 minutes for the second user, and 68 minutes for the third user) in the subset of users (e.g., three users out of five total users) and the total run time of the first media asset (e.g., 68 minutes for the first episode of Westworld), the amount of consumption of the first media asset for each user (e.g., 32 divided by 68 (47%) for the first user, 32 divided by 68 (88%) for the second user, and 68 divided by 68 (100%) for the third user) in the subset of users (e.g., three users out of five users).

In some embodiments, the media guidance application may determine that the amount of consumption for the first media asset (e.g., the first episode of Westworld) is the viewing pattern for any subsequent related media asset to the first media asset (e.g., a subsequent episode of Westworld). For example, the media guidance application may determine that the viewing pattern comprises the amount of consumption information, the time (e.g., time 102 and time 114) when the one or more users watched the media asset, the pattern of viewing commands, or a combination of the above.

The media guidance application may retrieve a plurality of viewing commands associated with a second media asset performed by each user in the subset of users. The media guidance application may retrieve the plurality of viewing commands from a database (e.g., a database that stores each media asset accessed by the user and the corresponding viewing commands for that media asset) in the profile for the user. The media guidance application may retrieve the viewing commands from each profile corresponding to each user in the subset of users. For example, the media guidance application may retrieve (e.g., from user profiles) a plurality of viewing commands associated with a second media asset (e.g., the second episode of Westworld) performed by each user in the subset of users.

The media guidance application may determine whether the plurality of commands satisfy the viewing pattern. For example, the media guidance application may compare the plurality of commands to the viewing pattern, as described in detail below.

The media guidance application may determine an amount of consumption of the second media asset for each user in the subset of users. For example, the media guidance application may determine the amount of consumption using similar methods as described above for determining the amount of consumption for the first media asset.

In some embodiments, when the media guidance application determines the amount of consumption of the second media asset for each user in the subset of users, the media guidance application may periodically retrieve, from the user profiles corresponding to the subset of users in the plurality of user profiles, viewing commands performed by each user in the subset of users related to the second media asset. The media guidance application may retrieve how frequently (e.g., the period of time) to retrieve the viewing commands from a setting in the profile. The media guidance application may determine that the setting is either a default value preset by the editor, or defined by the user via user input. For example, the media guidance application may periodically retrieve (e.g., once a day as specified in the settings of the profile), from the user profiles corresponding to the subset of users in the plurality of user profiles, viewing commands performed by each user in the subset of users related to the second media asset (e.g., the second episode of Westworld).

The media guidance application may periodically calculate an updated amount of consumption of the second media asset for each user in the subset of users. The media guidance application may calculate the updated amount of consumption each time after periodically retrieving the viewing commands. For example, the media guidance application may periodically calculate (e.g., once a day) an updated amount of consumption of the second media asset for each user in the subset of users (e.g., 68/68 (100%) for user one, 61/68 (90%) for user two, and 68/68 (100%) for user three).

The media guidance application may update the amount of consumption of the second media asset for each user in the subset of users to be the updated amount of consumption of the second media asset for each user in the subset of users. For example, the media guidance application may update the amount of consumption of the second media asset (e.g., the second episode of Westworld) for each user in the subset of users to be the updated amount of consumption (e.g., 100% for user one, 90% for user two, and 100% for user three).

The media guidance application may compare the amount of consumption of the second media asset for each user in the subset of users to the amounts of consumption of the first media asset from the viewing pattern. For example, the media guidance application may compare the amount of consumption of the second media asset for each user in the subset of users (e.g., 47% for the first user, 88% for the second user, and 100% for the third user) to the amounts of consumption of the first media asset from the viewing pattern (e.g., 100% for user one, 90% for user two, and 100% for user three).

In some embodiments, when the media guidance application compares the amount of consumption of the second media asset for each user in the subset of users to the amounts of consumption of the first media asset from the viewing pattern, the media guidance application may determine whether the amount of consumption of the second media asset for each user in the subset of users exceeds the amount of consumption of the first media asset for each user in the subset of users. For example, the media guidance application may determine whether the amount of consumption of the second media asset (e.g., 100% for user one, 90% for user two, and 100% for user three) exceeds the amount of consumption of the first media asset (e.g., 47% for the first user, 88% for the second user, and 100% for the third user).

As another example, the media guidance application may determine whether the amount of consumption of the second media asset (e.g., play, 3-fast forwards, view 10 minutes of the second media asset, pause, fast-forward, play) exceeds the amount of consumption of the first media asset (e.g., play, 3-fast forwards, view 10 minutes of the second media asset, pause, fast-forward, play). The media guidance application may determine that the amount of consumption of the second media asset exceeds the amount of consumption of the first media asset if the pattern of commands from the first media asset and the second media asset are the same, or contain a threshold amount of the same commands, where the threshold amount of commands is a default value determined by an editor that may be updated by the user and retrieved from the profile.

In response to determining whether the amount of consumption of the second media asset for each user in the subset of users exceeds the amount of consumption of the first media asset for each user in the subset of users, the media guidance application may determine that plurality of viewing commands satisfy the viewing pattern. For example, the media guidance application may determine that the amount of consumption of the second media asset (e.g., 100% for user one, 90% for user two, and 100% for user three) exceeds the amount of consumption of the first media asset (e.g., 47% for the first user, 88% for the second user, and 100% for the third user), and thus satisfies the viewing pattern.

In response to determining that the plurality of viewing commands satisfy the viewing pattern, the media guidance application may delete the second media asset from storage. For example, in response to determining that the plurality of viewing commands satisfy the viewing pattern, the media guidance application may delete the second media asset (e.g., the second episode of Westworld) from storage.

In some embodiments, in response to determining that the plurality of viewing commands satisfy the viewing pattern, the media guidance application may compare the second media asset to one or more entries in a "do not delete" datastore to determine whether the second media asset may be deleted. The media guidance application may determine that media assets are added to the "do not delete" datastore based on user input (e.g., a user indicates that a media asset is important and should not be deleted), metadata (e.g., the media asset's metadata indicates that the media asset is rare and/or important), or a combination of both. In response to determining that the media asset corresponds to an entry in the datastore, the media guidance application may not delete the second media asset from storage. In some embodiments, the media guidance application may permanently keep the second media asset in response to determining that it corresponds to an entry in the datastore.

In some embodiments, when the media guidance application deletes the second media asset from storage, the media guidance application may determine whether the second media asset is stored at one of a cloud storage device or a local storage device or whether the second media asset is stored at both the cloud storage device and the local storage device. For example, the media guidance application may determine that the second media asset is stored on both the cloud storage device (e.g., a remote server) and the local storage device (e.g., a local hard drive).

In response to determining that the second media asset is stored on both the cloud storage device and the local storage device, the media guidance application may determine whether the cloud storage device has more available storage than the local storage device. For example, the media guidance application may send a request to the cloud storage device and the local storage device requesting the amount of available storage. Based on the response to the request (e.g., the cloud storage has 100 GB of available space and the local storage has 1 GB of available space), the media guidance application may determine that the cloud storage device has more available storage than the local storage device.

In response to determining that the cloud storage device has more available storage than the local storage device, the media guidance application may delete the second media asset from the local storage device. For example, the media guidance application may delete the second media asset (e.g., the second episode of Westworld) from the local storage device (e.g., the local hard drive).

In some embodiments, in response to determining that the second media asset is stored on both the cloud storage device and the local storage device, the media guidance application may determine whether the cloud storage device has more available storage than the local storage device. For example, the media guidance application may send a request to the cloud storage device and the local storage device requesting the amount of available storage. Based on the response to the request (e.g., the cloud storage has 10 GB of available space and the local storage has 100 GB of available space), the media guidance application may determine that the local storage device has more available storage than the cloud storage device.

In response to determining that the cloud storage device has less available storage than the local storage device, the media guidance application may delete the second media asset from the cloud storage device. For example, the media guidance application may delete the second media asset (e.g., the second episode of Westworld) from the cloud storage device (e.g., the remote server).

In some embodiments, in response to determining that both the cloud storage device and the local storage device do not have available storage, the media guidance application may delete the second media asset from both the cloud storage device and the local storage device. For example, the media guidance application may delete the second media asset (e.g., the second episode of Westworld) from the local storage device (e.g., the local hard drive) and the cloud storage device (e.g., the remote server).

In some embodiments, the media guidance application may detect a command from the user to delete a third media asset from storage. The media guidance application may detect the command from the user to delete the third media asset from storage using similar methods as described above. For example, the media guidance application may detect, based on a user input on a controller, a command to delete the third media asset (e.g., a recorded movie that the user finished watching).

In some embodiments, the media guidance application may determine, based on the viewing pattern, whether to generate an overlay, wherein the overlay comprises a first option for the user to delete the third media asset from storage and a second option for the user to delete the media asset from storage based on the viewing pattern. The media guidance application may determine, based on the viewing pattern, whether a plurality of viewing commands corresponding to the third media asset satisfies the viewing pattern. The media guidance application may determine whether the plurality of viewing commands corresponding to the third media asset satisfies the viewing pattern using the methods described above. The media guidance application may determine to generate the overlay in response to determining that the plurality of viewing commands corresponding to the third media asset does not satisfy the viewing pattern. The media guidance application may determine, based on a selection from the user, which option the user wants, and may delete the third asset from storage immediately in response to determining that the user selected the first option. The media guidance application may delete the third media asset when the third media asset satisfies the viewing pattern in response to the media guidance application determining that the user selected the second option.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
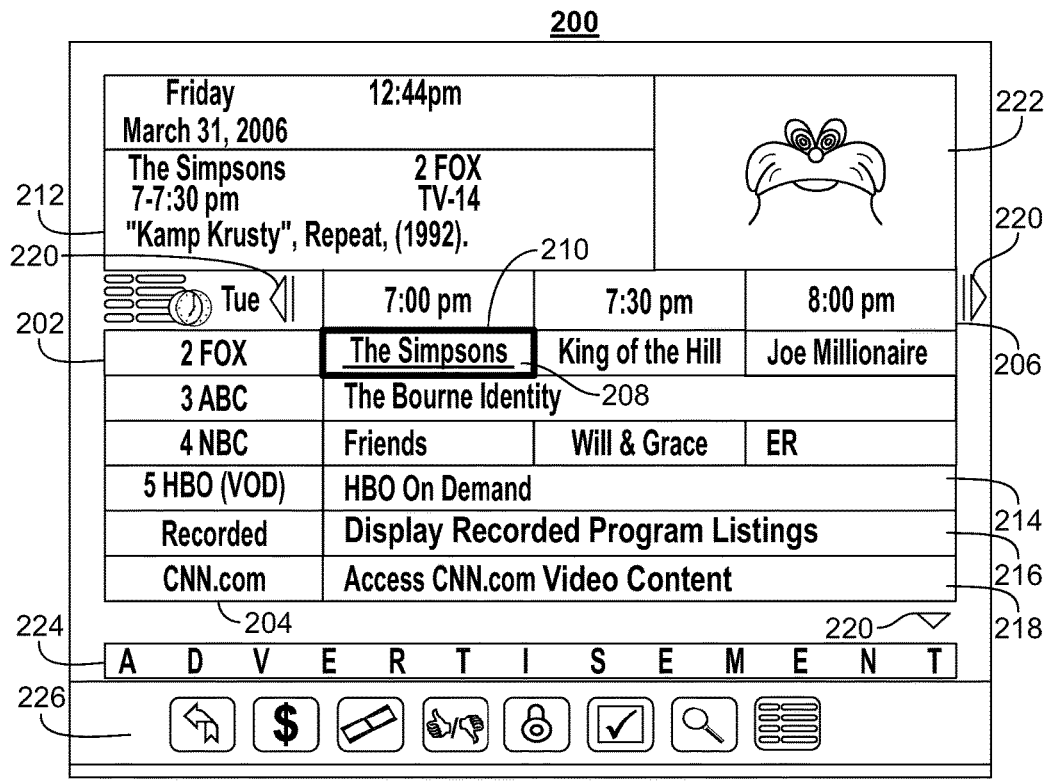
FIG. 2 shows an illustrative embodiment of a display screen that may be used to provide media guidance application listings and other media guidance information, in accordance with some embodiments of the disclosure.
Figure 3:
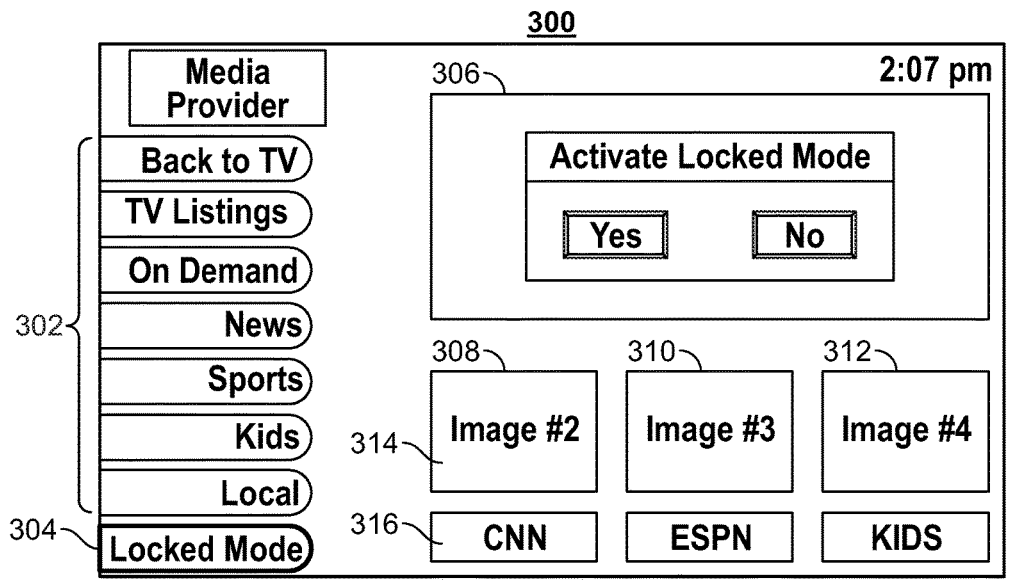
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
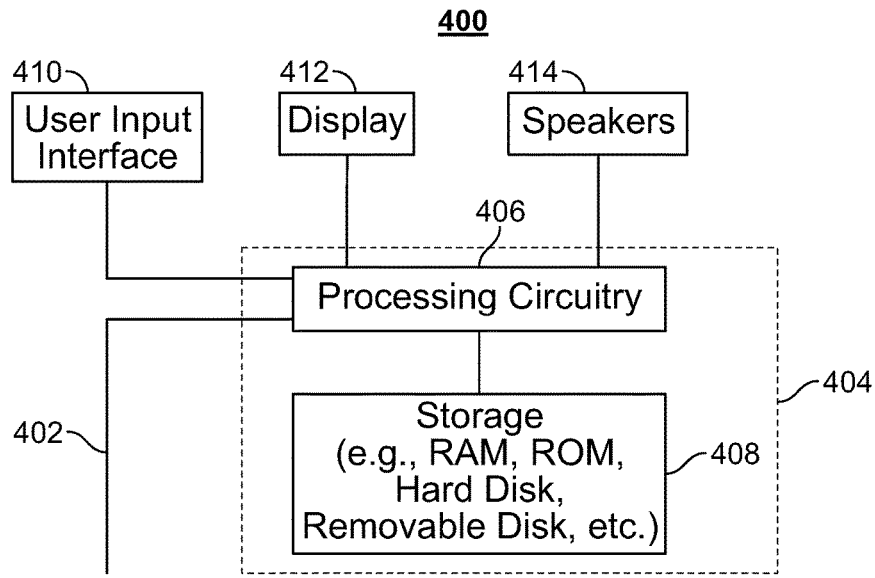
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
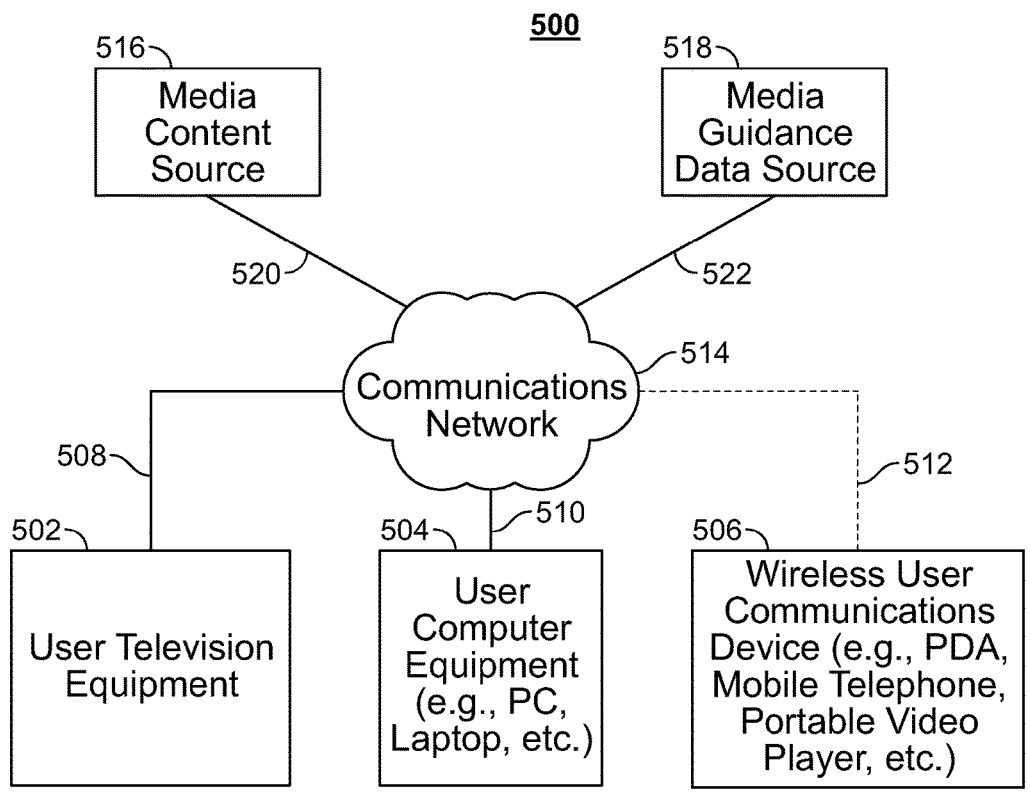
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
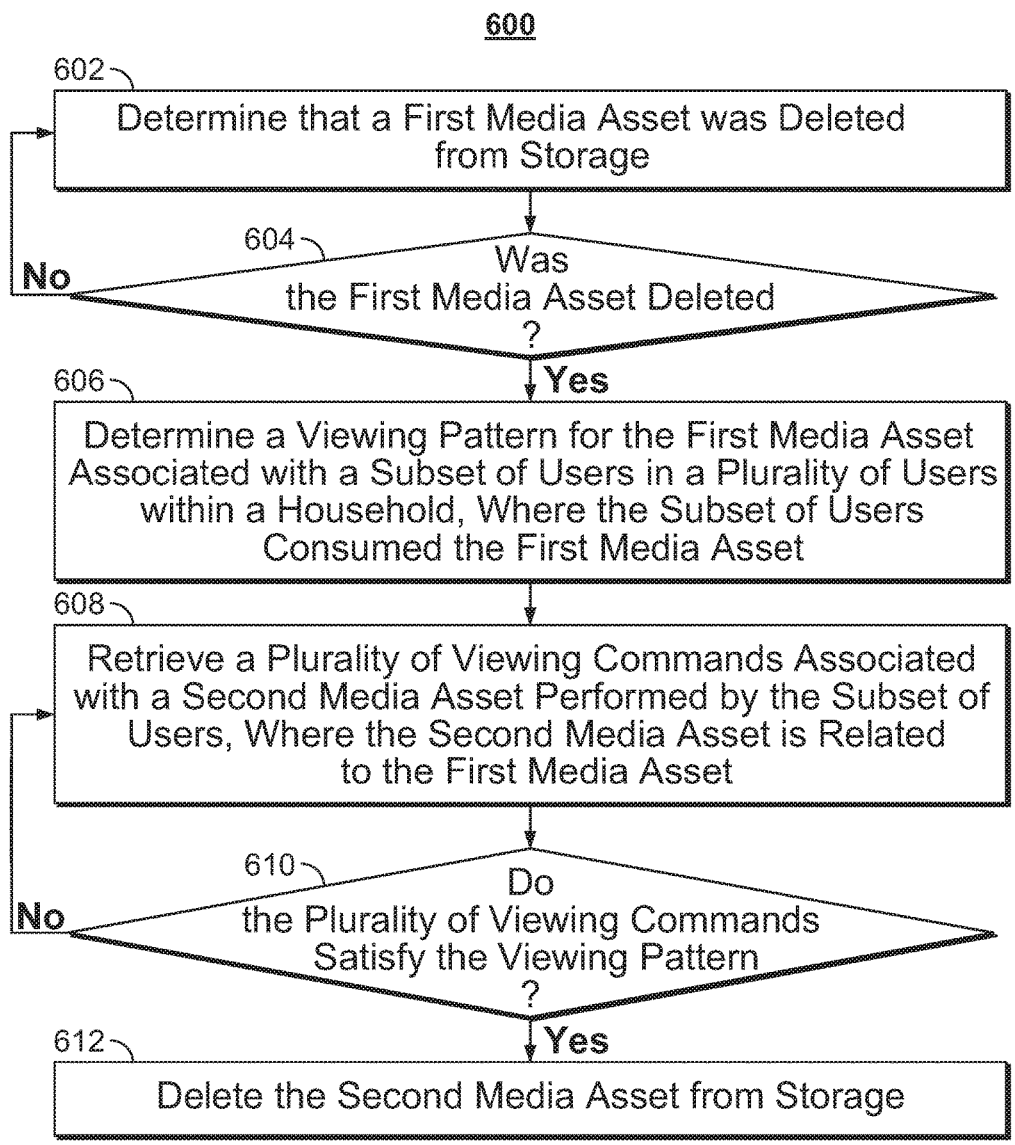
FIG. 6 depicts an illustrative flowchart of a process for managing local and cloud storage space for a plurality of media assets, in accordance with some embodiments of the disclosure.

FIG. 6 depicts an illustrative flowchart of a process for managing local and cloud storage space for a plurality of media assets, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514, or distributed over a combination of both.

At 602, control circuitry 404 detects that a command was received to delete a first media asset from storage. Control circuitry 404 may receive the command from user television equipment 502 (e.g., a remote controller) or via user input interface 410. For example, user 108 (e.g., or user 110 or user 120) may select the first media asset and press the delete input on user television equipment 502 (e.g., a remote controller) via user input interface 410 to delete the first media asset (e.g., the first episode of Westworld).

At 604, control circuitry 404 determines whether the delete command was detected. Control circuitry 404 retrieves user commands input from user input interface 410 and determines whether one or more of the user commands corresponds to a delete command. If, at 604, control circuitry 404 determines that "No," the delete command was not detected, process 604 reverts to 602.

If, at 604, control circuitry 404 determines that "Yes," the delete command was not detected, process 604 proceeds to 606. At 606, control circuitry 404 determines a viewing pattern for the first media asset associated with a subset of users in a plurality of users within a household, where the subset of users consumed the first media asset. Control circuitry 404 may determine the viewing pattern for the first media asset associated with a subset of users in a plurality of users within a household using similar methods as described in detail above.

At 608, control circuitry 404 retrieves a plurality of viewing commands associated with a second media asset performed by the subset of users, where the second media asset is related to the first media asset. For example, control circuitry 404 retrieves the plurality of viewing commands associated with the second media asset from profiles associated with the subset of users stored in storage 408, or stored on a remote server and retrieved via communications network 514, or a combination of the both.

At 610, control circuitry 404 determines whether the plurality of viewing commands satisfy the viewing pattern. If, at 610, control circuitry 404 determines that "No," the plurality of viewing commands do not satisfy the viewing pattern, then process 610 reverts to 608. For example, if control circuitry 404 determines that the amounts of consumption corresponding to the second media asset does not exceed the amounts of consumption corresponding to the first media asset, then control circuitry 404 reverts to process 608.

If, at 610, control circuitry determines that "Yes," the plurality of viewing commands do satisfy the viewing pattern, then process 610 proceeds to 612. For example, if control circuitry 404 determines that the amounts of consumption corresponding to the second media asset exceeds the amounts of consumption corresponding to the first media asset, then control circuitry 404 proceeds to process 612. At 612, control circuitry 404 deletes the second media asset from storage. Control circuitry 404 deletes the second media asset from storage 408 (e.g., local storage) or from media content source 516 (e.g., cloud storage), or from both storages, as determined and described in detail above.

Figure 7:
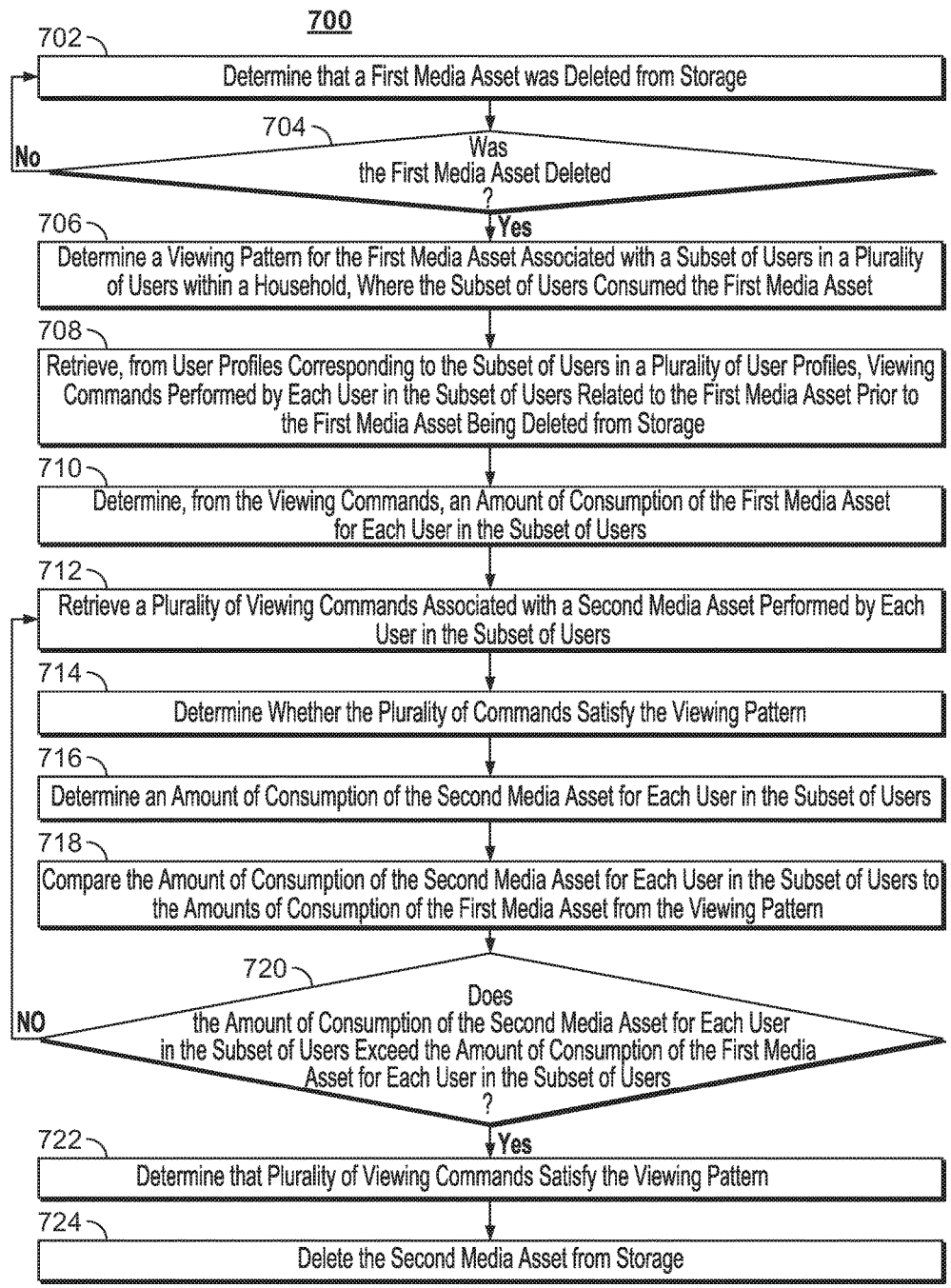
FIG. 7 depicts an illustrative flowchart of a process for managing local and cloud storage space for a plurality of media assets, in accordance with some embodiments of the disclosure.

FIG. 7 depicts an illustrative flowchart of a process for managing local and cloud storage space for a plurality of media assets, in accordance with some embodiments of the disclosure. At 702, control circuitry 404 detects that a command was received to delete a first media asset from storage. Control circuitry 404 may receive the command from user television equipment 502 (e.g., a remote controller) or via user input interface 410. For example, user 108 (e.g., or user 110 or user 120) may select the first media asset and press the delete input on user television equipment 502 (e.g., a remote controller) via user input interface 410 to delete the first media asset (e.g., the first episode of Westworld).

At 704, control circuitry 404 determines whether the delete command was detected. Control circuitry 404 retrieves user commands input from user input interface 410 and determines whether one or more of the user commands corresponds to a delete command. If, at 704, control circuitry 404 determines that "No," the delete command was not detected, process 704 reverts to 702. If, at 704, control circuitry 404 determines that "Yes," the delete command was detected, process 704 reverts to 706.

At 706, control circuitry 404 determines a viewing pattern for the first media asset associated with a subset of users in a plurality of users within a household, where the subset of users consumed the first media asset. Control circuitry 404 may determine the viewing pattern for the first media asset associated with a subset of users in a plurality of users within a household using similar methods as described in detail above.

At 708, control circuitry 404 retrieves, from user profiles corresponding to the subset of users in a plurality of user profiles, viewing commands performed by each user in the subset of users related to the first media asset prior to the first media asset being deleted from storage. Control circuitry 404 retrieves the user profiles from storage 408 or from a remote server via communications network 514, or any combination of the both. For example, control circuitry 404 may retrieve the viewing commands from a database in each user profile corresponding to each user in the subset of users from storage 408.

At 710, control circuitry 404 determines, from the viewing commands, an amount of consumption of the first media asset for each user in the subset of users. Control circuitry 404 may determine the amount of consumption of the first media asset for each user in the subset of users using similar methods as described above. For example, control circuitry 404 may determine the amount of consumption by retrieving the viewing commands corresponding to the first media asset for each user in the subset of users from storage 408 or from a remote server via communications network 514, or a combination of the two. Control circuitry 404 may then compare the viewing commands to the total run time of the first media asset (e.g., determined from metadata for the first media asset retrieved from the profile stored in storage 408 or retrieved from a remote server via communications network 514).

At 712, control circuitry 404 retrieves a plurality of viewing commands associated with a second media asset performed by each user in the subset of users. For example, control circuitry 404 retrieves the plurality of viewing commands associated with the second media asset performed by each user in the subset of users from profiles for each user in storage 408, or from a remote server via communications network 514, or a combination of the two. At 714, control circuitry 404 determines whether the plurality of commands satisfy the viewing pattern. Control circuitry 404 determines whether the plurality of commands satisfy the viewing pattern using similar methods as described in detail above.

At 716, control circuitry 404 determines an amount of consumption of the second media asset for each user in the subset of users. Control circuitry 404 determines the amount of consumption using similar methods as determining the amount of consumption for the first media asset for each user in the subset of users. At 718, control circuitry 404 compares the amount of consumption of the second media asset for each user in the subset of users to the amounts of consumption of the first media asset from the viewing pattern.

At 720, control circuitry 404 determines whether the amount of consumption of the second media asset for each user in the subset of users exceed the amount of consumption of the first media asset for each user in the subset of users. If, at 720, control circuitry 404 determines that "No," the amount of consumption of the second media asset for each user in the subset of users does not exceed the amount of consumption of the first media asset for each user in the subset of users, then process 720 reverts to 712.

If, at 720, control circuitry 404 determines that "Yes," the amount of consumption of the second media asset for each user in the subset of users exceeds the amount of consumption of the first media asset for each user in the subset of users, then process 720 proceeds to 722. At 722, control circuitry 404 determines that plurality of viewing commands satisfy the viewing pattern. At 724, control circuitry 404 deletes the second media asset from storage. For example, control circuitry 404 deletes the second media asset from storage 408 (e.g., local storage).

Figure 8:
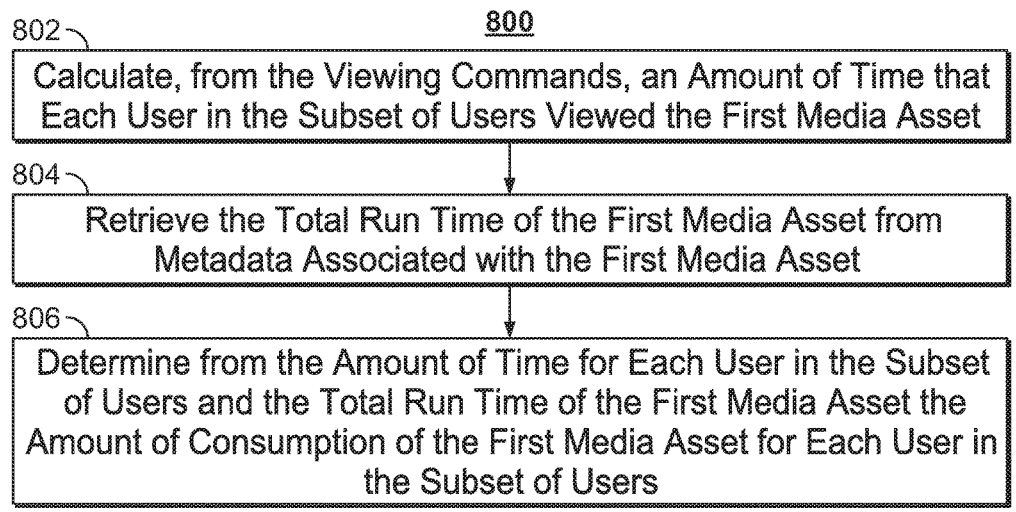
FIG. 8 depicts an illustrative flowchart of a process for determining, from the viewing commands, the amount of consumption of the first media asset for each user in the subset of users, in accordance with some embodiments of the disclosure.

FIG. 8 depicts an illustrative flowchart of a process for determining, from the viewing commands, the amount of consumption of the first media asset for each user in the subset of users, in accordance with some embodiments of the disclosure. At 802, control circuitry 404 calculates, from the viewing commands, an amount of time that each user in the subset of users viewed the first media asset. Control circuitry 404 retrieves viewing commands (e.g., start and stop times of the user viewing the media asset) from the profile corresponding to the user in storage 408. Control circuitry 404 calculates the amount of time that each user in the subset of users viewed the first media asset from the retrieved viewing commands.

At 804, control circuitry 404 retrieves the total run time of the first media asset from metadata associated with the first media asset. Control circuitry 404 retrieves the total run time of the first media asset from metadata stored in storage 408. Control circuitry 404 may also retrieve the total run time of the first media asset from media guidance data source 518. For example, control circuitry 404 may retrieve, from media guidance data source 518, the run time of the first episode of Westworld (e.g., 68 minutes).

At 806, control circuitry 404 determines from the amount of time for each user in the subset of users and the total run time of the first media asset the amount of consumption of the first media asset for each user in the subset of users. Control circuitry 404 calculates the amount of consumption by dividing the amount of time for each user in the subset of users by the total run time of the first media asset. For example, control circuitry 404 calculates the amount of consumption (e.g., 34/68 for the first user, 68/68 for the second user, and 10/68 for the third user) by dividing the amount of time for each user in the subset of users (e.g., 34 minutes for the first user, 68 minutes for the second user, and 10 minutes for the third user) by the total run time of the first media asset (e.g., 68 minutes).

Figure 9:
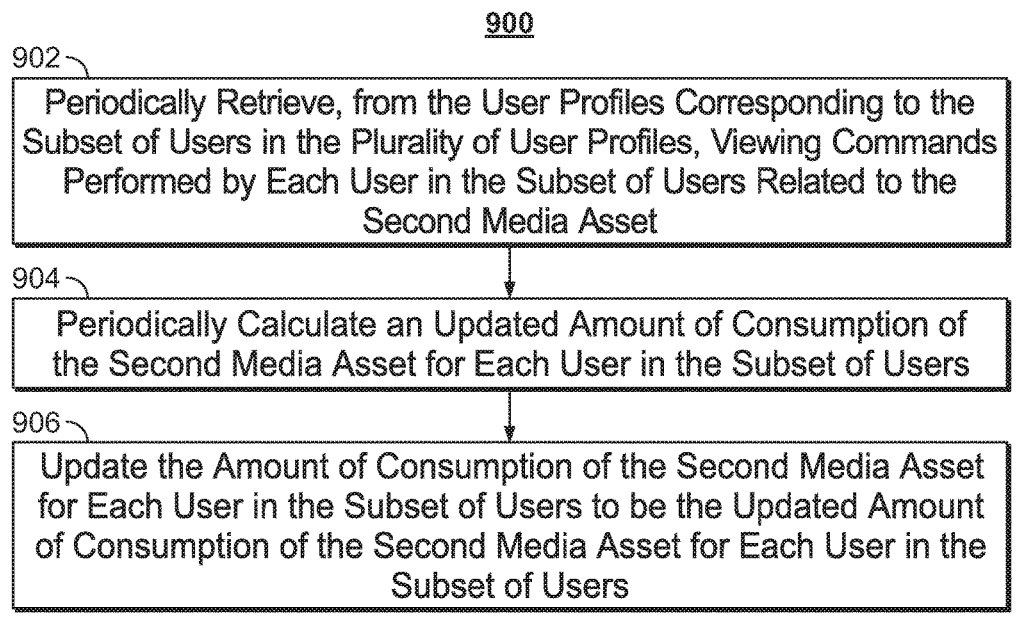
FIG. 9 depicts an illustrative flowchart of a process for determining the amount of consumption of the second media asset for each user in the subset of users, in accordance with some embodiments of the disclosure.

FIG. 9 depicts an illustrative flowchart of a process for determining the amount of consumption of the second media asset for each user in the subset of users, in accordance with some embodiments of the disclosure. At 902, control circuitry 404 periodically retrieves, from the user profiles corresponding to the subset of users in the plurality of user profiles, viewing commands performed by each user in the subset of users related to the second media asset. For example, control circuitry 404 may periodically retrieve (e.g., based on a period defined by a setting in the profile) viewing commands performed by each user in the subset of users related to the second media asset (e.g., the second episode of Westworld).

At 904, control circuitry 404 periodically calculates an updated amount of consumption of the second media asset for each user in the subset of users. Control circuitry 404 periodically calculates (e.g., based on a period defined by a setting in the profile, which may be the same period as when retrieving the viewing commands) the updated amount of consumption using the same methods as described in detail above for calculating the amount of consumption.

At 906, control circuitry 404 updates the amount of consumption of the second media asset for each user in the subset of users to be the updated amount of consumption of the second media asset for each user in the subset of users. Control circuitry 404 updates the amount of consumption of the second media asset using similar methods as described above.

Figure 10:
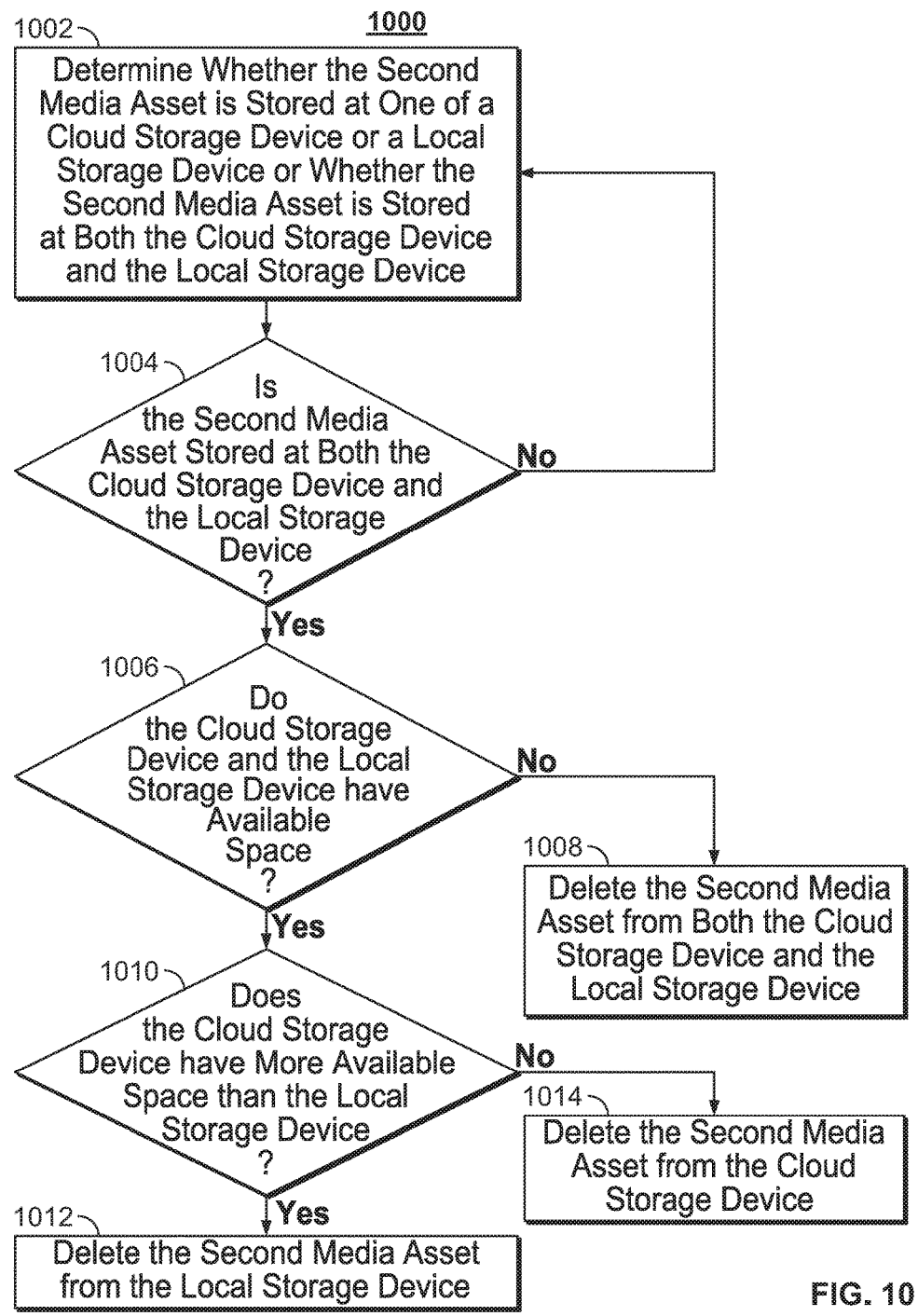
FIG. 10 depicts an illustrative flowchart of a process for deleting the second media asset from storage, in accordance with some embodiments of the disclosure.

FIG. 10 depicts an illustrative flowchart of a process for deleting the second media asset from storage, in accordance with some embodiments of the disclosure. At 1002, control circuit 404 determines whether the second media asset is stored at one of a cloud storage device or a local storage device or whether the second media asset is stored at both the cloud storage device and the local storage device. For example, control circuitry 404 may determine whether the second media asset is stored on storage 408 (e.g., local storage) or a remote server (e.g., cloud storage), or both.

At 1004, control circuitry 404 determines whether the second media asset is stored at both the cloud storage device and the local storage device. If, at 1004, control circuitry 404 determines that "No," the second media asset is not stored at both the cloud storage device and the local storage device, then process 1004 reverts to 1002. If, at 1006, control circuitry 404 determines that "Yes," the second media asset is stored at both the cloud storage device and the local storage device, then process 1004 proceeds to 1006.

At 1006, control circuitry 404 determines whether the cloud storage device and the local storage device have available space. If, at 1006, control circuitry 404 determines that "No," the cloud storage device and the local storage device do not have available space, then process 1006 proceeds to 1008. At 1008, control circuitry 404 deletes the second media asset from both the cloud storage device and the local storage device.

If, at 1006, control circuitry 404 determines that "Yes," the cloud storage device and the local storage device have available space, then process 1006 proceeds to 1010. At 1010, control circuitry 404 determines whether the cloud storage device has more available space than the local storage device. If, at 1010, control circuitry 404 determines that "Yes," the cloud storage device has more available space than the local storage device, then process 1010 proceeds to 1012. At 1012, control circuitry deletes the second media asset from the local storage device. For example, control circuitry 404 deletes the second media asset (e.g., the second episode of Westworld) from storage 408.

If, at 1010, control circuitry 404 determines that "No," the cloud storage device does not have more available space than the local storage device, then process 1010 proceeds to 1014. At 1014, control circuitry 404 deletes the second media asset from the cloud storage device. For example, control circuitry 404 deletes the second media asset (e.g., the second episode of Westworld) from a remote server (e.g., cloud storage) via communications network 514.

Figure 1B:
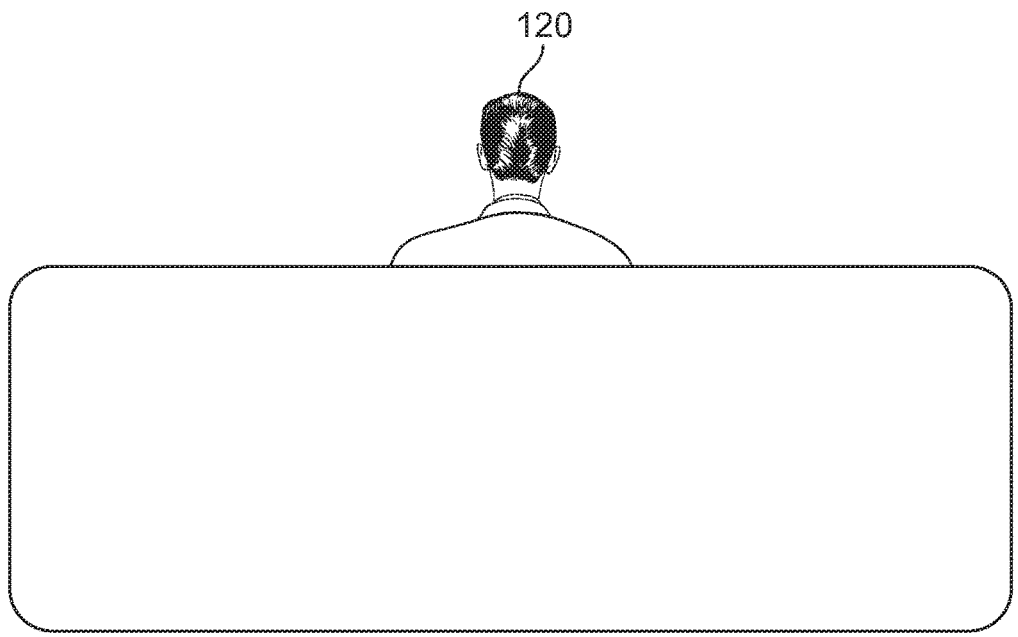

It should be noted that processes 600-1000 or any step thereof could be performed on, or provided by, any of the devices shown in FIGS. 1 and 4-5. For example, any of processes 600-1000 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1000 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for managing local and cloud storage space for a plurality of media assets, comprising:
   determining that a first media asset was deleted from storage;
   in response to determining that the first media asset was deleted from storage, determining a viewing pattern for the first media asset associated with a subset of users in a plurality of users within a household, wherein the subset of users consumed the first media asset, and wherein the determining of the viewing pattern comprises:
   retrieving, from user profiles corresponding to the subset of users in a plurality of user profiles, viewing commands performed by each user in the subset of users related to the first media asset prior to the first media asset being deleted from storage; and
   determining, from the viewing commands, an amount of consumption of the first media asset for each user in the subset of users;
   retrieving a plurality of viewing commands associated with a second media asset performed by each user in the subset of users;
   determining whether the plurality of viewing commands satisfy the viewing pattern by:
   determining an amount of consumption of the second media asset for each user in the subset of users;
   comparing the amount of consumption of the second media asset for each user in the subset of users to the amounts of consumption of the first media asset from the viewing pattern;
   in response to determining whether the amount of consumption of the second media asset for each user in the subset of users exceeds the amount of consumption of the first media asset for each user in the subset of users, determining that plurality of viewing commands satisfy the viewing pattern; and in response to determining that the plurality of viewing commands satisfy the viewing pattern, deleting the second media asset from storage.

2. The method of claim 1, further comprising:
detecting a command from the user to delete a third media asset from storage; and
determining, based on the viewing pattern, whether to generate an overlay, wherein the overlay comprises a first option for the user to delete the third media asset from storage and a second option for the user to delete the third media asset from storage based on the viewing pattern.

3. The method of claim 1, wherein determining, from the viewing commands, the amount of consumption of the first media asset for each user in the subset of users comprises:
calculating, from the viewing commands, an amount of time that each user in the subset of users viewed the first media asset;
retrieving the total run time of the first media asset from metadata associated with the first media asset; and
determining from the amount of time for each user in the subset of users and the total run time of the first media asset the amount of consumption of the first media asset for each user in the subset of users.

4. The method of claim 1, wherein determining the amount of consumption of the second media asset for each user in the subset of users comprises:
periodically retrieving, from the user profiles corresponding to the subset of users in the plurality of user profiles, viewing commands performed by each user in the subset of users related to the second media asset.

5. The method of claim 4, further comprising:
periodically calculating an updated amount of consumption of the second media asset for each user in the subset of users; and
updating the amount of consumption of the second media asset for each user in the subset of users to be the updated amount of consumption of the second media asset for each user in the subset of users.

6. The method of claim 1, wherein comparing the amount of consumption of the second media asset for each user in the subset of users to the amounts of consumption of the first media asset from the viewing pattern comprises determining whether the amount of consumption of the second media asset for each user in the subset of users exceeds the amount of consumption of the first media asset for each user in the subset of users.

7. The method of claim 1, wherein in response to determining that the plurality of viewing commands satisfy the viewing pattern, deleting the second media asset from storage comprises determining whether the second media asset is stored at one of a cloud storage device or a local storage device or whether the second media asset is stored at both the cloud storage device and the local storage device.

8. The method of claim 7, further comprising:
in response to determining that the second media asset is stored on both the cloud storage device and the local storage device, determining whether the cloud storage device has more available storage than the local storage device; and
in response to determining that the cloud storage device has more available storage than the local storage device, deleting the second media asset from the local storage device.

9. The method of claim 7, further comprising:
in response to determining that the second media asset is stored on both the cloud storage device and the local storage device, determining whether the cloud storage device has more available storage than the local storage device; and
in response to determining that the cloud storage device has less available storage than the local storage device, deleting the second media asset from the cloud storage device.

10. The method of claim 7, further comprising:
in response to determining that the second media asset is stored on both the cloud storage device and the local storage device, determining whether the cloud storage device has available storage and whether the local storage device has available storage; and
in response to determining that both the cloud storage device and the local storage device do not have available storage, deleting the second media asset from both the cloud storage device and the local storage device.

11. A system for managing local and cloud storage space for a plurality of media assets, comprising:
user input circuitry; and
control circuitry configured to:
determine that a first media asset was deleted from storage;
in response to determining that the first media asset was deleted from storage, determine a viewing pattern for the first media asset associated with a subset of users in a plurality of users within a household, wherein the subset of users consumed the first media asset, and wherein the determining of the viewing pattern comprises:
retrieve, from user profiles corresponding to the subset of users in a plurality of user profiles, viewing commands performed by each user in the subset of users related to the first media asset prior the first media asset being deleted from storage; and
determine, from the viewing commands, an amount of consumption of the first media asset for each user in the subset of users;
retrieve a plurality of viewing commands associated with a second media asset performed by each user in the subset of users;
determine whether the plurality of viewing commands satisfy the viewing pattern by:
determining an amount of consumption of the second media asset for each user in the subset of users;
comparing the amount of consumption of the second media asset for each user in the subset of users to the amounts of consumption of the first media asset from the viewing pattern;
in response to determining whether the amount of consumption of the second media asset for each user in the subset of users exceeds the amount of consumption of the first media asset for each user in the subset of users, determining that plurality of viewing commands satisfy the viewing pattern; and
in response to determining that the plurality of viewing commands satisfy the viewing pattern, delete the second media asset from storage.

12. The system of claim 11, wherein the control circuitry is further configured to:
detect a command from the user to delete a third media asset from storage; and
determine, based on the viewing pattern, whether to generate an overlay, wherein the overlay comprises a first option for the user to delete the third media asset from storage and a second option for the user to delete the third media asset from storage based on the viewing pattern.

13. The system of claim 11, wherein the control circuitry is further configured, when determining, from the viewing commands, the amount of consumption of the first media asset for each user in the subset of users, to:
   calculate, from the viewing commands, an amount of time that each user in the subset of users viewed the first media asset;
   retrieve the total run time of the first media asset from metadata associated with the first media asset; and
   determine from the amount of time for each user in the subset of users and the total run time of the first media asset the amount of consumption of the first media asset for each user in the subset of users.

14. The system of claim 11, wherein the control circuitry is further configured, when determining the amount of consumption of the second media asset for each user in the subset of users, to:
   periodically retrieve, from the user profiles corresponding to the subset of users in the plurality of user profiles, viewing commands performed by each user in the subset of users related to the second media asset.

15. The system of claim 14, wherein the control circuitry is further configured to:
   periodically calculate an updated amount of consumption of the second media asset for each user in the subset of users; and
   update the amount of consumption of the second media asset for each user in the subset of users to be the updated amount of consumption of the second media asset for each user in the subset of users.

16. The system of claim 11, wherein the control circuitry is further configured, when comparing the amount of consumption of the second media asset for each user in the subset of users to the amounts of consumption of the first media asset from the viewing pattern, to determine whether the amount of consumption of the second media asset for each user in the subset of users exceeds the amount of consumption of the first media asset for each user in the subset of users.

17. The system of claim 11, wherein the control circuitry is further configured, in response to determining that the plurality of viewing commands satisfy the viewing pattern, to delete the second media asset from storage comprises determining whether the second media asset is stored at one of a cloud storage device or a local storage device or whether the second media asset is stored at both the cloud storage device and the local storage device.

18. The system of claim 17, wherein the control circuitry is further configured to:
   in response to determining that the second media asset is stored on both the cloud storage device and the local storage device, determine whether the cloud storage device has more available storage than the local storage device; and
   in response to determine that the cloud storage device has more available storage than the local storage device, deleting the second media asset from the local storage device.

19. The system of claim 17, wherein the control circuitry is further configured to:
   in response to determining that the second media asset is stored on both the cloud storage device and the local storage device, determine whether the cloud storage device has more available storage than the local storage device; and
   in response to determining that the cloud storage device has less available storage than the local storage device, delete the second media asset from the cloud storage device.

20. The system of claim 17, wherein the control circuitry is further configured to:
   in response to determining that the second media asset is stored on both the cloud storage device and the local storage device, determine whether the cloud storage device has available storage and whether the local storage device has available storage; and
   in response to determining that both the cloud storage device and the local storage device do not have available storage, delete the second media asset from both the cloud storage device and the local storage device.

* * * * *